Sept. 8, 1964  A. BOUGEARD  3,147,967
PNEUMATIC SHOCK ABSORBER
Original Filed Jan. 13, 1961  3 Sheets-Sheet 1

Inventor
Arthur Bougeard
by Michael J. Striker

Sept. 8, 1964    A. BOUGEARD    3,147,967
PNEUMATIC SHOCK ABSORBER
Original Filed Jan. 13, 1961    3 Sheets-Sheet 2

Inventor
Arthur Bougeard
by
Richael J. Striker

United States Patent Office 3,147,967
Patented Sept. 8, 1964

3,147,967
PNEUMATIC SHOCK ABSORBER
Arthur Bougeard, 25 Blvd. Pierre Landais,
Vitre, Ille et Villaine, France
Original application Jan. 13, 1961, Ser. No. 85,760, now Patent No. 3,100,635, dated Aug. 13, 1963. Divided and this application June 14, 1963, Ser. No. 288,006
Claims priority, application France June 27, 1956
12 Claims. (Cl. 267—65)

This application is a divisional application of the copending application Serial No. 85,760, filed January 13, 1961, now Patent No. 3,100,635, which in turn is a continuation-in-part application of the application Serial No. 666,711, now abandoned filed June 19, 1957.

The present invention relates to pneumatic shock absorbers adapted to interconnect a pair of members tending to move with respect to each other under the influence of a force and shock absorbers of this type may for instance be used in automotive vehicles between the body of the vehicle and the stub axle of each wheel.

It is an object of the present invention to provide for a pneumatic shock absorber which, when connected to a pair of members tending to move with respect to each other under the influence of a given force, will hold the two members spaced from each other a given distance under normal operating position while permitting the two members to move away from or toward each other when additional forces act on the members in the one or the other direction, and which is constructed in such a manner to restore the original position of the two members with respect to each other, when the additional forces do not act any longer.

It is an additional object of the present invention to provide for such a pneumatic shock absorber which is composed of a few relatively simple and rugged parts so that the shock absorber will perform trouble-free after extended use.

With these objects in view the pneumatic shock absorber of the present invention which is adapted to interconnect a pair of members tending to move with respect to each other under the influence of the force mainly comprises a cylinder adapted to be connected to one of the aforementioned members and this cylinder has a first closed end and a second closed end opposite to the first closed end. The shock absorber according to the present invention includes further a piston reciprocable in said cylinder and dividing the latter in a first pressure chamber between the piston and the first closed end of the cylinder, and a second pressure chamber between the piston and the second closed end of the cylinder. Piston rod means are fixed to the piston extending at least through one of the closed ends of the cylinder in sealed relationship thereto and this piston rod means is adapted to be connected to the other of the pair of members. Means communicate through the first closed end of the cylinder with the first pressure chamber for supplying compressed air thereinto, while preventing flow of compressed air through said means out of the first pressure chamber so as to move the piston against the force acting on the members away from the first toward the second closed end of the cylinder so that air in the second pressure chamber will be compressed until the piston rod reaches a normal operating position in which the force tending to move the two members with respect to each other is counter-balanced by a force produced by the pressure difference in the first and second pressure chambers. Passage means are formed in the piston rod means for providing communication between the pressure chambers when the piston moves from the normal operating position toward said second closed end, and for providing communication between the second pressure chamber and the outer atmosphere when the piston moves from the normal operating position toward the first closed end.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
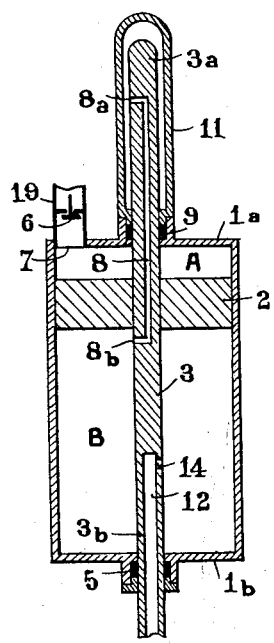
FIG. 1 is a partial cross-sectional view through one embodiment of a pneumatic shock absorber according to the present invention.
Figure 2:
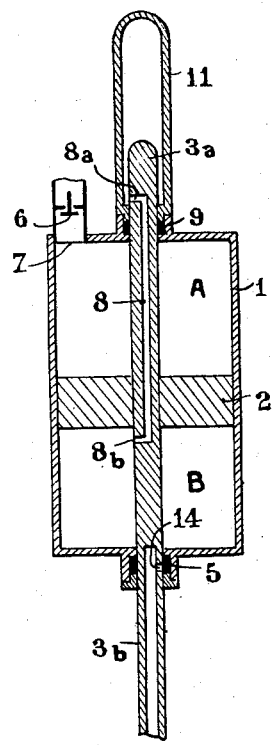
FIG. 2 is a cross-sectional view similar to FIG. 1 and showing the various members of the shock absorber illustrated in FIG. 1, in positions different from that shown in FIG. 1.
Figure 3:
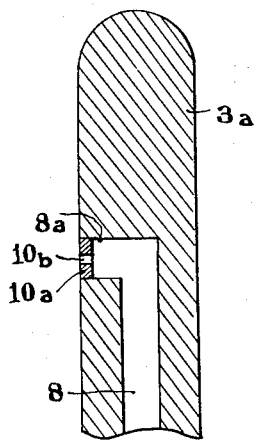
FIG. 3 is a partial cross-sectional view through a member of the embodiment shown in FIG. 1 and drawn to an enlarged scale.

Referring now to the drawings, and more specifically to FIGS. 1-3 thereof, it will be seen that the shock absorber according to the present invention mainly comprises a cylinder 1 having a first closed end 1a and a second closed end 1b opposite the first closed end, and a piston 2 slidably arranged in the cylinder 1 in substantially fluid-tight engagement with the inner surface thereof. The piston 2 divides the interior of the cylinder 1 in a first pressure chamber A between one side of the piston and the first closed end 1a and in a second pressure chamber B between the other side of the piston and the second closed end 1b. Piston rod means 3 are coaxially fixed to the piston and having a first portion 3a projecting from one side of the piston 2 and extending though an opening formed in the closed end 1a of the cylinder to the outside thereof. An elongated sleeve 11 is fixedly connected at one end to the first closed end 1a of the cylinder and projects coaxially with the piston rod means 3 therefrom and having a closed free end. The elongated sleeve 11 surrounds the portion 3a of the piston rod means outside the cylinder 1 with clearance. A sealing ring 9 held between the connected end of the sleeve 11 and the closed end of the cylinder fluid-tightly engages the piston rod means 3 and provides a seal at the opening in the closed end 1a of the cylinder through which the portion 3a of the piston rod means projects to the outside thereof. The piston rod means 3 comprises also a second portion 3b projecting from the other side of the piston 2 through an opening in the second closed end 1b of the cylinder beyond the latter. A sealing ring 5 fixed to the closed end 1b of the cylinder around the portion 3b of the piston rod means provides a fluid-tight seal at the opening through which the portion 3b of the piston rod means passes to the outside of the cylinder. A conduit 19 connected to a source of compressed air of predetermined pressure, not shown in the drawing, communicates through a port 7 formed in the closed end 1a of the cylinder with the first pressure chamber A for feeding compressed air thereinto. A one way valve 6 located in the conduit 19 permits flow of compressed air through the conduit 19 into the first pressure chamber A, while preventing flow of compressed air in the other direction. First passage means 8 are formed in the piston rod means 3 and these first passage means 8 have a first open end 8b permanently communicating with the second pressure chamber B and a second open end 8a in the first portion 3a of the piston rod means 3 spaced a certain distance from the piston 2. Second passage means 12 are formed in the second portion 3b of the piston rod means 3 which have an outer open end at a free end of the portion 3b not shown in the drawing, and an inner open end 14, spaced a certain distance from the piston 2. Means are provided in the passage means 8 for restricting flow of compressed air between the pressure chambers, and these means may take the form of a diaphragm 10a extending transversely through the open end 8a and being formed with a small aperture 10b therethrough, as shown at an enlarged scale in FIG. 3. Instead of the diaphragm 10a with the aperture 10b therethrough, a non-return valve 13 may be provided adjacent the open end 8a which is constructed to permit flow of air only in the direction from the open end 8a to the open end 8b of the passage means 8 while preventing flow of air in the opposite direction through this passage means.

In the pneumatic shock absorber illustrated in FIGS. 1–3 the cylinder 1 is adapted to be connected to one of the members which tend to move with respect to each other under the influence of a force, while the end of the portion 3b of the piston rod means, not shown in the drawing, is adapted to be connected to the other of the members. When the shock absorber is used in a vehicle, the cylinder may be connected to the vehicle body and the lower end of the piston rod means 3 be connected to a wheel stub axle of the vehicle. In this case, a shock absorber is provided for each wheel stub axle.

The shock absorber above described will operate as follows:

Before compressed air is sent through the conduit 19 into the first pressure chamber A, the weight of a member which is secured to the cylinder 1, for instance the body of an automotive vehicle, tends to force the upper closed end 1a of the cylinder against the upper face of the piston 2 when the lower end of the piston rod means 3 is connected to the other member, for example the stub axle of a wheel. When compressed air of a given pressure is now fed through the conduit 19 into the first pressure chamber A, cylinder 1 and piston 2 will move relative to each other from the position shown in FIG. 1 to the position shown in FIG. 2. During this movement air contained in the second pressure chamber B can escape therefrom through the opening 14 and the second passage means 12 to the outer atmosphere until shortly before cylinder 1 and piston 2 reach the position shown in FIG. 2. As can be visualized from FIGS. 1 and 2, shortly before the position shown in FIG. 2 is reached, the second passage means 12 will not communicate with the second pressure chamber B any longer, since the upper open end 14 thereof moves downwardly beyond the lower closed end 1b of the cylinder into the region of the packing 5. From this moment on, the air trapped in the second pressure chamber B will be compressed to an increasing extent to counteract the force produced by the air pressure in the first pressure chamber A which tends to move the piston 2 downwardly relative to the cylinder 1. The position of equilibrium will be reached when the force produced by the air pressure in the pressure chamber A on the piston 2 minus the force produced by the compressed air in the pressure chamber B will be equal to the total load acting on the shock absorber. The distance of the second open end 8a from the piston 2 has to be chosen in such a way that this open end is to be located within the elongated sleeves 11 when the shock absorber is in the position of equilibrium as shown in FIG. 2.

In this position of equilibrium the device will act as an elastic suspension device and as a shock absorber. Any external effort causing a sudden or slow overloading or unloading of the piston rod will produce a relative displacement of the piston with respect to the cylinder in one or the other direction against the elastic resistance of the air present in the pressure chambers A and B.

When the piston 2 moves under the influence of outside forces acting on the piston rod means 3 upwardly with respect to the cylinder 1, the aperture 14 of the second passage means 12 will move into the second pressure chamber B, which will thereby communicate with the outer atmosphere so that the pressure in the second pressure chamber will be reduced and the increased pressure in the first pressure chamber A will therefore move the piston 2 again downwardly with respect to the cylinder 1 until the position of equilibrium shown in FIG. 2 is reached again.

Figure 3A:
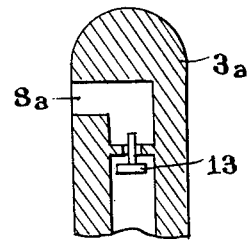
FIG. 3a is a partial cross-sectional view similar to FIG. 3 and showing a modification of the arrangement shown in FIG. 3.

On the other hand, if the piston 2 moves under the influence of external forces downwardly with respect to the cylinder 1, it is necessary to consider the manner in which the external forces are applied. If the load variation is slow and extensive, the open end 8a of the first passage means 8 will move into the first pressure chamber A and establish thus communication between the pressure chambers A and B so that compressed air of higher pressure in the pressure chamber A may flow into the pressure chamber B and force thereby the piston 2 back to the position of equilibrium. On the other hand, if the load variation takes place rather suddenly, the air contained in the pressure chamber B will be suddenly compressed and force the piston 2 back to the position of equilibrium. It should be noted that during such sudden compression in which the pressure in the pressure chamber B may be increased beyond the pressure maintained in the pressure chamber A, any substantial return flow of air from the pressure chamber B into the pressure chamber A will be prevented by the diaphragm 10a, and of course, if a non-return valve 13 is provided, as shown in FIG. 3a, in the passage means 8, no air can flow in the direction from the pressure chamber B to the pressure chamber A.

It should be noted that the position of equilibrium is independent from the load applied to the device and this position will be maintained as long as air of predetermined pressure is supplied to the conduit 19. When during increase of load acting on the device the piston 2 will tend to move upwardly in the cylinder 1, the pressure chamber B will be placed in communication with the outer atmosphere, so that the pressure in this chamber is reduced, and so that the pressure in the pressure chamber A which is kept constant will force the piston back to the position of equilibrium. On the other hand, if the load is reduced, so that the piston 2 moves downwardly with respect to the cylinder 1, the passage means 8 will provide communication between pressure chambers A and B thereby increasing the pressure in the pressure chamber B and forcing the piston 2 to the position of equilibrium.

Figure 4:
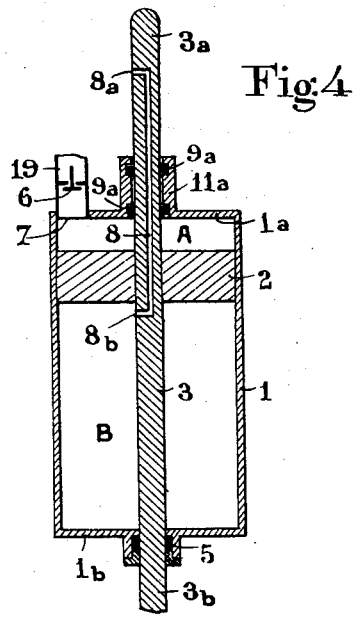
FIG. 4 is a cross-sectional view similar to FIG. 1 and showing a further embodiment of a shock absorber according to the present invention.
Figure 5:
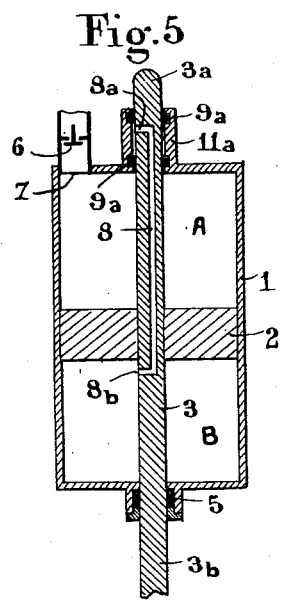
FIG. 5 is a cross-sectional view showing the embodiment illustrated in FIG. 4 with various members of the shock absorber displaced from the position shown in FIG. 4.
Figure 6:
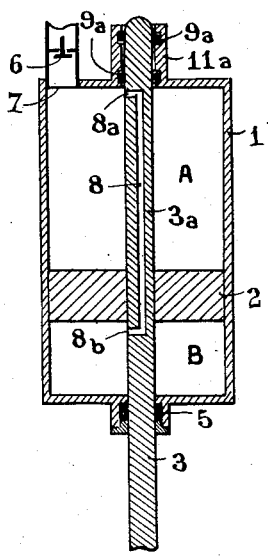
FIG. 6 is a cross-sectional view showing the same embodiment as illustrated in FIG. 4 in which various members are further displaced from the position shown in FIG. 4.

FIGS. 4–6 illustrate a simplified embodiment of the shock absorber of the present invention. In this embodiment the passage 8 formed in the piston rod 3 is not only adapted to provide communication between the first pressure chamber A and the second pressure chamber B, but the passage 8 serves in this embodiment also as an exhaust passage connecting the lower pressure chamber B with the outer atmosphere during upward travel of the piston. To this end, the sleeve 11 of the embodiment illustrated in FIGS. 1 and 2, which is closed at its outer end, is replaced by a shorter sleeve or socket 11a, open at its outer end in which adjacent both ends thereof packings or sealing rings 9a are provided which sealingly engage the portion 3a of the piston rod 3 passing through the sleeve 11a. Under these conditions, the first open end 8a of the passage means 8 is located outside of the sleeve 11a in the initial position of the device, as shown in FIG. 4, so that the second pressure chamber B communicates with the outer atmosphere. When air of predetermined pressure is fed through conduit 19 past the non-return valve 6 and through the port 7 into the first pressure chamber A, the piston 2 will move downwardly with respect to the cylinder 1 until the position of equilibrium, shown in FIG. 5, is reached in which the first or upper open end 8a of the passage means 8 is located between the sealing rings 9a in the sleeve 11a so that the exhaust from the pressure chamber B is closed and so that the two pressure chambers are out of communication with each other.

If, on account of external forces, the piston 2 is caused to move downward with respect to the cylinder 1 as shown in FIG. 6, until the first open end 8a of the passage means 8 is moved out of the sleeve 11a into communication with the first pressure chamber A, communication will be established between pressure chamber A and pressure chamber B, and to assure compression of air in the pressure chamber B during such movement, the passage 8 of the embodiment is provided with an air flow limiting device, comprising a diaphragm 10a with a small aperture 10b formed therein, as shown in FIG. 3 in connection with the first described embodiment. In the embodiment shown in FIGS. 4-6 a one way valve 13, as shown in FIG. 3a, cannot be used, since the passage 8 forms in this embodiment also the exhaust passage for the pressure chamber B. The lower portion 3b of the piston rod means 3 extends in the embodiment shown in FIGS. 4-6, through an opening in the lower closed end 1b of the cylinder 1 and sealing means 5 are again provided around this opening and sealingly engaging the portion 3b of the piston rod means to prevent escape of air from the pressure chamber B through this opening.

Figure 7:
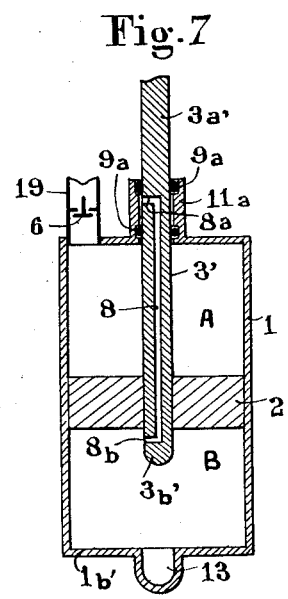
FIG. 7 is a cross-sectional view showing an additional embodiment of a shock absorber according to the present invention.

FIG. 7 shows an additional, even more simplified embodiment according to the present invention, which differs from the embodiment shown in FIGS. 4-6 in that the lower portion 3b' of the piston rod means 3' extends only a short distance beyond the lower face of the piston 2 and does not extend through an opening in the lower closed end 1b' of the cylinder 1. In this embodiment, the bottom wall of the cylinder 1 forming the lower closed end 1b' is formed with an outwardly closed cavity 13 adapted to house the portion 3b' of the piston rod means when the piston 2 moves far downward in the cylinder 1. In this construction the upper portion 3a' of the piston rod means is extended and adapted to be connected to one of the members to be suspended or supported by the device shown in FIG. 7.

In the embodiment shown in FIGS. 1-3 as well as the embodiment shown in FIGS. 4-6 the movable members interconnected by the device are mounted in opposition. Thus, when utilizing the device as a suspension device between the body of an automobile or other vehicle and the wheel, the body is secured to the upper end of the cylinder 1 and the lower end of the piston rod means 3 is so attached to the wheel stub axle so that during operation the body is supported by the air cushion formed in the pressure chamber A. In the embodiment illustrated in FIG. 7 such a mounting is not possible any longer, since the piston rod means 3' does not extend through and beyond the lower closed end of the cylinder.

In this case, the two members to be interconnected by the device, for example, a vehicle body and the wheel stub axle, should be connected to the device from the same side, that is, on the side of the cylinder corresponding to the pressure chamber A. Thus, the device may be traction operated by mounting the wheels accordingly.

Figure 8:
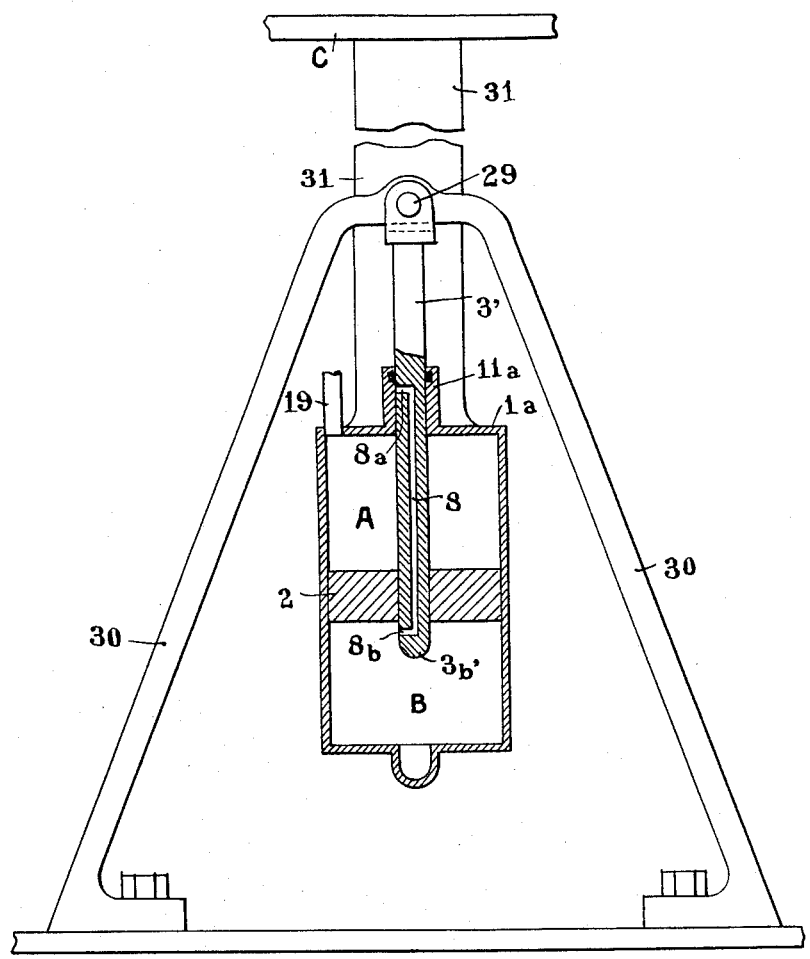
FIG. 8 is a partial cross-sectional view illustrating the embodiment of FIG. 7 and means connected to the shock absorber for attaching the cylinder and the piston rod respectively to the two members to be interconnected by the shock absorber.

But this simplified device shown in FIG. 7 may also be used as a suspension device on a vehicle in which the wheels are mounted in the conventional manner. To this end the device may be left in the same position as the devices of the preceding embodiments, that is, by disposing the closed end 1a of the cylinder provided with the port 7 for receiving air under pressure at the top. In this case, the upper end 29 of the piston rod means 3' is preferably suspended from a yoke like member 30 connected to and carried by the wheel stub axle R while the cylinder 1 is connected at its upper end through a member 31 with the body C of the vehicle, as shown in FIG. 8. When the arrangement shown in FIG. 8 is in inoperative position, that is, when no compressed air is fed into the pressure chamber A, the cylinder and the load thereon is supported by the piston which in turn is supported by the wheel stub axle, and in the operative position the weight of the vehicle is supported by the compressed air in the pressure chamber A and the device will operate as described before.

Of course, it would also be possible to reverse the position of the device in which case the end of the piston rod means 3' extending outside of the cylinder would be below the cylinder 1. In this case, the body of the vehicle should be mounted on an inverted yoke connected with the lower end of the piston rod means 3' and the bottom of the cylinder should be connected with the wheel stop axle.

It will be understood that each of the elements described above, or two or more together, may also find a useful application in other types of shock absorber differing from the types described above.

While the invention has been illustrated and described as embodied in pneumatic shock absorbers adapted to interconnect a pair of members tending to move with respect to each other under influence of a force, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A pneumatic shock absorber adapted to interconnect a pair of members tending to move with respect to each other under the influence of a force comprising, in combination, a cylinder adapted to be connected to one of said members and having a first closed end and a second closed end opposite said first closed end; a piston reciprocable in said cylinder and dividing the latter into a first pressure chamber between said piston and said first closed end of said cylinder and a second pressure chamber between said piston and said second closed end of said cylinder; piston rod means fixed to said piston and extending at least through one of said closed ends in sealed relationship thereto and being adapted to be connected to the other of said members; means communicating through said first closed end of said cylinder with said first pressure chamber for supplying compressed air thereinto while preventing flow of compressed air through said means out of said first pressure chamber so as to move said piston against said force away from said first toward said second closed end of said cylinder so that air in said second pressure chamber will be compressed until said piston reaches a normal operating position in which said force is counterbalanced by a force produced by the pressure difference between said first and second pressure chambers; and passage means formed in said piston rod means for providing communication between said pressure chambers when said piston moves from said normal operating position toward said second closed end and for providing communication between said second pressure chamber and the outer atmosphere when said piston moves from said normal operating position toward said first closed end.

2. A penumatic shock absorber adapted to interconnect a pair of members tending to move with respect to each other under the influence of a force comprising, in combination, a cylinder adapted to be connected to one of said members and having a first closed end and a second closed end opposite said first closed end; a piston reciprocable in said cylinder and dividing the latter into a first pressure chamber between said piston and said first closed end of said cylinder and a second pressure chamber between said piston and said second closed end of said cylinder; piston rod means fixed to said piston and extending at least through one of said closed ends in sealed relationship thereto and being adapted to be connected to the other of said members; means communicating through said first closed end of said cylinder with said first pressure chamber for supplying compressed air thereinto while preventing flow of compressed air through said means out of said first pressure chamber so as to move said piston against said force away from said first toward said second closed end of said cylinder so that air in said second pressure chamber will be compressed until said piston reaches a normal operating position in which said force is counterbalanced by a force produced by the pressure difference between said first and second pressure chambers; passage means formed in said piston rod means for providing communication between said pressure chambers when said piston moves from said normal operating position toward said second closed end and for providing communication between said second pressure chamber and the outer atmosphere when said piston moves from said normal operating position toward said first closed end; and means in said passage means for restricting flow of compressed air between said pressure chambers.

3. A pneumatic shock absorber adapted to interconnect a pair of members tending to move with respect to each other under the influence of a force comprising, in combination, a cylinder adapted to be connected to one of said members and having a first closed end and a second closed end opposite said first closed end; a piston reciprocable in said cylinder and dividing the latter into a first pressure chamber between said piston and said first closed end of said cylinder and a second pressure chamber between said piston and said second closed end of said cylinder; piston rod means fixed to said piston and extending at least through one of said closed ends in sealed relationship thereto and being adapted to be connected to the other of said members; means communicating through said first closed end of said cylinder with said first pressure chamber for supplying compressed air thereinto while preventing flow of compressed air through said means out of said first pressure chamber so as to move said piston against said force away from said first toward said second closed end of said cylinder so that air in said second pressure chamber will be compressed until said piston reaches a normal operating position in which said force is counterbalanced by a force produced by the pressure difference between said first and second pressure chambers; passage means formed in said piston rod means for providing communication between said pressure chambers when said piston moves from said normal operating position toward said second closed end and for providing communication between said second pressure chamber and the outer atmosphere when said piston moves from said normal operating position toward said first closed end; and means in said passage means permitting flow of air through the passage means only from said first to said second pressure chamber during movement of said piston toward said second closed end.

4. A pneumatic shock absorber adapted to interconnect a pair of members tending to move with respect to each other under the influence of a force comprising, in combination, a cylinder adapted to be connected to one of said members and having a first closed end and a second closed end opposite said first closed end; a piston reciprocable in said cylinder and dividing the latter into a first pressure chamber between said piston and said first closed end of said cylinder and a second pressure chamber between said piston and said second closed end of said cylinder; piston rod means fixed to said piston and having a first portion extending through said first closed end in sealed relationship thereto and a second portion extending through said second closed end in sealed relationship thereto and being adapted to be connected to the other of said members; means communicating through said first closed end of said cylinder with said first pressure chamber for supplying compressed air thereinto while preventing flow of compressed air through said means out of said first pressure chamber so as to move said piston against said force away from said first toward said second closed end of said cylinder so that air in said second pressure chamber will be compressed until said piston reaches a normal operating position in which said force is counterbalanced by a force produced by the pressure difference between said first and second pressure chambers; first passage means formed in said piston rod means and having a first open end permanently communicating with said second pressure chamber and a second open end in said first portion of said piston rod means and spaced from said piston such a distance so as to be outside of said cylinder when said piston is in said normal operating position and communicating with said first pressure chamber when said piston is moved from said normal operating position toward said second closed end of said cylinder to thus provide communication between said first and said second pressure chambers; means in said first passage means for throttling flow of air therethrough; means cooperating with said second open end of said first passage means for preventing escape of air from said second pressure chamber through said first passage means into the atmosphere; second passage means formed in said second portion of said piston rod means and having an outer open end communicating with the atmosphere and an inner open end spaced from said piston such a distance so as to be inside said second pressure chamber when said piston is moved from said normal operating position toward said first closed end so that air may escape from said second pressure chamber into the atmosphere to reduce the pressure in said second pressure chamber and so as to be outside said cylinder when said piston is in said normal operating position and when said piston moves from said normal operating position toward said second closed end of said cylinder to thus prevent escape of air from said second pressure chamber.

5. A pneumatic shock absorber adapted to interconnect a pair of members tending to move with respect to each other under the influence of a force comprising, in combination, a cylinder adapted to be connected to one of said members and having a first closed end and a second closed end opposite said first closed end; a piston reciprocable in said cylinder and dividing the latter into a first pressure chamber between said piston and said first closed end of said cylinder and a second pressure chamber between said piston and said second closed end of said cylinder; piston rod means fixed to said piston and having a first portion extending through said first closed end in sealed relationship thereto and a second portion extending through said second closed end in sealed relationship thereto and being adapted to be connected to the other of said members; means communicating through said first closed end of said cylinder with said first pressure chamber for supplying compressed air thereinto while preventing flow of compressed air through said means out of said first pressure chamber so as to move said piston against said force away from said first toward said second closed end of said cylinder so that air in said second pressure chamber will be compressed until said piston reaches a normal operating position in which said force is counterbalanced by a force produced by the pressure difference between said first and second pressure chambers; first passage means formed in said piston rod means and having a first open end permanently communicating with said second pressure chamber and a second open end in said first portion of said piston rod means and spaced from said piston such a distance so as to be outside of said cylinder when said piston is in said normal operating position and communicating with said first pressure chamber when said piston is moved from said normal operating position toward said second closed end of said cylinder to thus provide communication between said first and said second pressure chambers; means in said first passage means for permitting flow of air through said first passage means only from said first to said second pressure chamber; means cooperating with said second open end of said first passage means for preventing escape of air from said second pressure chamber through said first passage means into the atmosphere; second passage means formed in said second portion of said piston rod means and having an outer open end communicating with the atmosphere and an inner open end spaced from said piston such a distance so as to be inside said second pressure chamber when said piston is moved from said normal operating position toward said first closed end so that air may escape from said second pressure chamber into the atmosphere to reduce the pressure in said second pressure chamber and so as to be outside said cylinder when said piston is in said normal operating position and when said piston moves from said normal operating position toward said second closed end of said cylinder to thus prevent escape of air from said second pressure chamber.

6. A pneumatic shock aborsber adapted to interconnect a pair of members tending to move with respect to each other under the influence of a force comprising, in combination, a cylinder adapted to be connected to one of said members and having a first closed end and a second closed end opposite said first closed end; a piston reciprocable in said cylinder and dividing the latter into a first pressure chamber between said piston and said first closed end of said cylinder and a second pressure chamber between said piston and said second cloesd end of said cylinder; piston rod means fixed to said piston and having a first portion extending through said first closed end in sealed relationship thereto and a second portion extending through said second closed end in sealed relationship thereto and being adapted to be connected to the other of said members; means communicating through said first closed end of said cylinder with said first pressure chamber for supplying compressed air thereinto while preventing flow of compressed air through said means out of said first pressure chamber so as to move said piston against said force away from said first toward said second closed end of said cylinder so that air in said second pressure chamber will be compressed until said piston reaches a normal operating position in which said force is counterbalanced by a force produced by the pressure difference between said first and second pressure chambers; first passage means formed in said piston rod means and having a first open end permanently communicating with said second pressure chamber and a second open end in said first portion of said piston rod means and spaced from said piston such a distance so as to be outside of said cylinder when said piston is in said normal operating position and communicating with said first pressure chamber when said piston is moved from said normal operating position toward said second closed end of said cylinder to thus provide communication between said first and said second pressure chambers; means in said first passage means for throttling flow of air therethrough; an elongated sleeve fixedly connected at one end to said first closed end of said cylinder, projecting coaxially with said piston rod means therefrom, being closed at the other end and surrounding the first portion of said piston rod means for preventing escape of air from said second pressure chamber through said first passage means into the atmosphere; second passage means formed in said second portion of said piston rod means and having an outer open end communicating with the atmosphere and an inner open end spaced from said piston such a distance so as to be inside said second pressure chamber when said piston is moved from said normal operating position toward said first closed end so that air may escape from said second pressure chamber into the atmosphere to reduce the pressure in said second pressure chamber and so as to be outside said cylinder when said piston is in said normal operating position and when said piston moves from said normal operating position toward said second closed end of said cylinder to thus prevent escape of air from said second pressure chamber.

7. A pneumatic shock absorber adapted to interconnect a pair of members tending to move with respect to each other under the influence of a force comprising, in combination, a cylinder adapted to be connected to one of said members and having a first closed end and a second closed end opposite said first closed end; a piston reciprocable in said cylinder and dividing the latter into a first pressure chamber between said piston and said first closed end of said cylinder and a second pressure chamber between said piston and said second closed end of said cylinder; piston rod means fixed to said piston and having a first portion projecting to one side of said piston and a second portion projecting to the other side thereof, said first portion extending in sealed relationship through said first closed end of said cylinder, said piston rod means being adapted to be connected to the other of said members; means communicating through said first closed end of said cylinder with said first pressure chamber for supplying compressed air thereinto while preventing flow of compressed air through said means out of said first pressure chamber so as to move said piston against said force away from said first toward said second closed end of said cylinder so that air in said second pressure chamber will be compressed until said piston reaches a normal operating position in which said force is counterbalanced by a force produced by the pressure difference between said first and second pressure chambers; passage means formed in said piston rod means and having a first open end in said second portion of said piston rod means permanently communicating with said second pressure chamber and a second open end in said first portion spaced from said piston such a distance so as to be outside said cylinder and to provide for communication of said second pressure chamber with the outer atmosphere when said piston has moved from said normal operating position toward said first closed end and so as to be inside said cylinder to provide communication between said pressure chambers when said piston has moved from said normal operating position toward said second closed end; and means cooperating with said second open end to prevent escape of air from said second pressure chamber when said piston is in said normal operating position.

8. A pneumatic shock absorber adapted to interconnect a pair of members tending to move with respect to each other under the influence of a force comprising, in combination, a cylinder adapted to be connected to one of said members and having a first closed end and a second closed end opposite said first closed end; a piston reciprocable in said cylinder and dividing the latter into a first pressure chamber between said piston and said first closed end of said cylinder and a second pressure chamber between said piston and said second closed end of said cylinder; piston rod means fixed to said piston and having a first portion projecting to one side of said piston and a second portion projecting to the other side thereof, said first portion extending in sealed relationship through said first closed end of said cylinder, said piston rod means being adapted to be connected to the other of said members; a sleeve fixedly connected at one end to said first closed end of said cylinder, projecting coaxially with said piston rod means therefrom and being at both ends thereof in sealing engagement with said first portion of said piston rod means; means communicating through said first closed end of said cylinder with said first pressure chamber for supplying compressed air thereinto while preventing flow of compressed air through said means out of said first pressure chamber so as to move said piston against said force away from said first toward said second closed end of said cylinder so that air in said second pressure chamber will be compressed until said piston reaches a normal operating position in which said force is counterbalanced by a force produced by the pressure difference between said first and second pressure chambers; passage means formed in said piston rod means for providing communication between said pressure chambers when said piston moves from said normal operating position toward said second closed end and for providing communication between said second pressure chamber and the outer atmosphere when said piston moves from said normal operating position toward said first closed end and passage means formed in said piston rod means and having a first open end in said second portion of said piston rod means permanently communicating with said second pressure chamber and a second open end in said first portion spaced from said piston such a distance so as to be between said ends of the sleeve when said piston is in said normal operating position, to be outside the other end of said sleeve and to provide communication of said second pressure chamber with the outer atmosphere when said piston is moved from said normal operating position toward said first closed end and so as to be inside said cylinder to provide communication between said pressure chambers when said piston has moved from said normal operating position toward said second closed end; and means cooperating with said second open end to prevent escape of air from said second pressure chamber when said piston is in said normal operating position.

9. A pneumatic shock absorber adapted to interconnect a pair of members tending to move with respect to each other under the influence of a force comprising, in combination, a cylinder adapted to be connected to one of said members and having a first closed end and a second closed end opposite said first closed end; a piston reciprocable in said cylinder and dividing the latter into a first pressure chamber between said piston and said first closed end of said cylinder and a second pressure chamber between said piston and said second closed end of said cylinder; piston rod means fixed to said piston and having a first portion projecting to one side of said piston and extending in sealed relationship through said first closed end, and having a second portion projecting to the other side of the piston and in sealed relationship through said other closed end of said cylinder, said second portion being adapted to be connected to the other of said members; a sleeve fixedly connected at one end to said first closed end of said cylinder, projecting coaxially with said piston rod means therefrom and being at both ends thereof in sealing engagement with said first portion of said piston rod means; and passage means formed in said piston rod means and having a first open end in said second portion of said piston rod means permanently communicating with said second pressure chamber and a second open end in said first portion spaced from said piston such a distance so as to be between said ends of the sleeve when said piston is in said normal operating position, to be outside the other end of said sleeve and to provide communication of said second pressure chamber with the outer atmosphere when said piston is moved from said normal operating position toward said first closed end and so as to be inside said cylinder to provide communication between said pressure chambers when said piston has moved from said normal operating position toward said second closed end; and means cooperating with said second open end to prevent escape of air from said second pressure chamber when said piston is in said normal operating position.

10. A pneumatic shock absorber adapted to interconnect a pair of members tending to move with respect to each other under the influence of a force comprising, in combination, a cylinder adapted to be connected to one of said members and having a first closed end and a second closed end opposite said first closed end; a piston reciprocable in said cylinder and dividing the latter into a first pressure chamber between said piston and said first closed end of said cylinder and a second pressure chamber between said piston and said second closed end of said cylinder; piston rod means fixed to said piston and having a first portion projecting to one side of said piston and a second portion projecting a short distance to the other side thereof, said first portion extending in sealed relationship through said first closed end of said cylinder, said first portion of said piston rod means being adapted to be connected to the other of said members, said cylinder being formed at said second closed end thereof with a cavity adapted to house said second portion of said piston rod means when said piston moves toward said second closed end of said cylinder; a sleeve fixedly connected at one end to said first closed end of said cylinder, projecting coaxially with said piston rod means therefrom and being at both ends thereof in sealing engagement with said first portion of said piston rod means; and passage means formed in said piston rod means and having a first open end in said second portion of said piston rod means permanently communicating with said second pressure chamber and a second open end in said first portion spaced from said piston such a distance so as to be between said ends of the sleeve when said piston is in said normal operating position, to be outside the other end of said sleeve and to provide communication of said second pressure chamber with the outer atmosphere when said piston is moved from said normal operating position toward said first closed end and so as to be inside said cylinder to provide communication between said pressure chambers when said piston has moved from said normal operating position toward said second closed end; and means cooperating with said second open end to prevent escape of air from said second pressure chamber when said piston is in said normal operating position.

11. A pneumatic shock absorber adapted to interconnect a pair of members spaced in vertical direction from each other and tending to move with respect to each other under the influence of a force comprising, in combination, an upright cylinder having an upper closed end and a lower closed end; supporting means projecting upwardly from said cylinder and engaging the upper of said spaced members; a piston reciprocable in said cylinder and dividing the latter into a first pressure chamber between said upper closed end of said cylinder and said piston and a second pressure chamber between said piston and said lower closed end of said cylinder; piston rod means fixed to said piston and having a first portion projecting to one side of the piston and in sealed relationship through said upper closed end of said cylinder, and having a second piston rod portion projecting a short distance to the other side of said piston; means communicating through said upper closed end of said cylinder with the first pressure chamber for supplying compressed air thereinto while preventing flow of compressed air through said means out of said first pressure chamber so as to move said piston against said force away from said upper toward said lower closed end of said cylinder so that air in said second pressure chamber will be compressed until said piston reaches a normal operating position in which said force tending to move said member with respect to each other is counterbalanced by a force produced by the pressure difference between said first and second pressure chambers; passage means formed in said piston rod means and having a first open end in said second portion of said piston rod means permanently communicating with said second pressure chamber and a second open end in said first portion spaced from said piston such a distance to be outside said cylinder and to provide communication of said second pressure chamber with the outer atmosphere when said piston has moved from said normal operating position toward said upper closed end and to be inside said cylinder to provide communication between said pressure chambers when said piston has moved from said normal operating position toward said second closed end; means cooperating with said second open end to prevent escape of air from said second pressure chamber when said piston is in said normal operating position; and yoke means pivotally attached at one end thereof to an end of said first portion of said piston rod means located outside said cylinder, said yoke means being attached at the other end thereof to the lower of said members.

12. A pneumatic shock absorber as set forth in claim 11 in which said upper of said members is a vehicle body and the lower of said members a wheel stub axle of the vehicle.

References Cited in the file of this patent
FOREIGN PATENTS
164,333    Great Britain _____ Mar. 23, 1922